(No Model.) 2 Sheets—Sheet 1.
A. PINNEY.
WATER HEATER.
No. 523,752. Patented July 31, 1894.
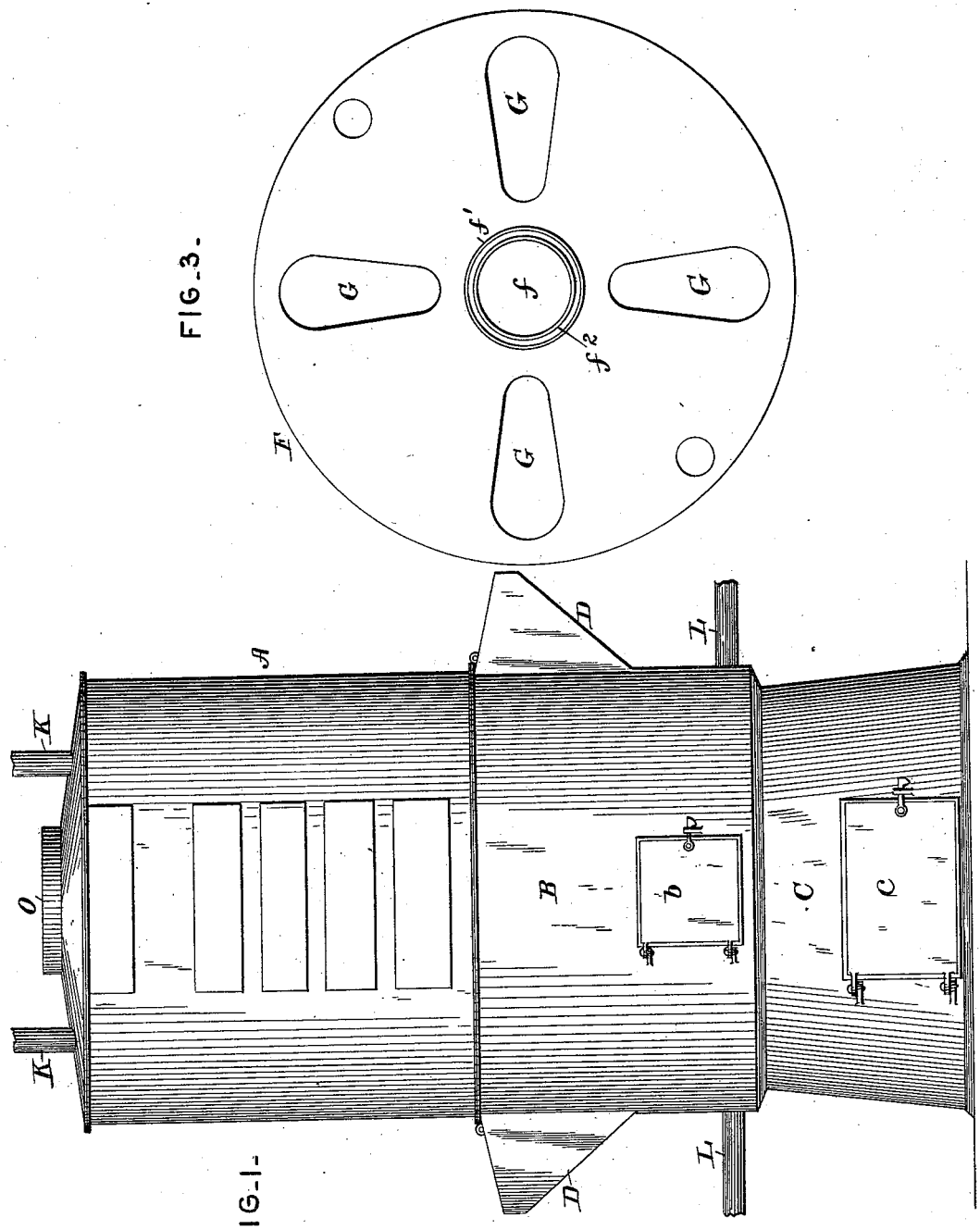
Witnesses
Jas. K. McCuthran
D. P. Wolhaupter
Inventor
A. Pinney
By his Attorneys,
C. A. Snow & Co.

(No Model.) 2 Sheets—Sheet 2.

A. PINNEY.
WATER HEATER.

No. 523,752. Patented July 31, 1894.

Witnesses
Jas. K. McCathran
D. P. Wolhaupter

Inventor
A. Pinney
By his Attorneys,
C. A. Snow & Co.

UNITED STATES PATENT OFFICE.

ADAM PINNEY, OF AKRON, OHIO.

WATER-HEATER.

SPECIFICATION forming part of Letters Patent No. 523,752, dated July 31, 1894.

Application filed February 18, 1892. Renewed June 28, 1894. Serial No. 516,023. (No model.)

*To all whom it may concern:*

Be it known that I, ADAM PINNEY, a citizen of the United States, residing at Akron, in the county of Summit and State of Ohio, have invented a new and useful Water-Heater, of which the following is a specification.

This invention relates to water heaters; and it has for its object to provide an improved water heater designed for heating and circulating hot water used in connection with hot water heating apparatus.

To this end, it is the main object of this invention to provide an improved heater of this type which shall be so constructed as to provide efficient means both for the heating and the circulation of the water therethrough, for this purpose providing greater area of water circulation and heating space, and generally to improve the construction of hot water heaters.

With these and many other objects in view which will readily appear as the nature of the invention is better understood, the same consists in the novel construction, combination and arrangement of parts hereinafter more fully described, illustrated and claimed.

Figure 4:
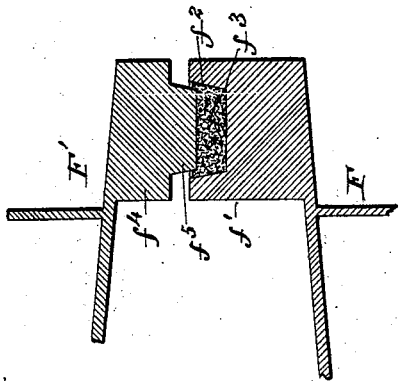
Figure 5:
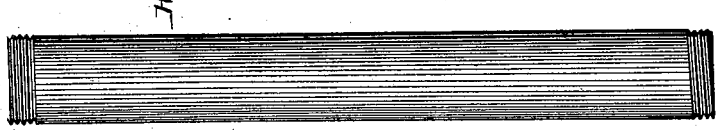
Figure 2:
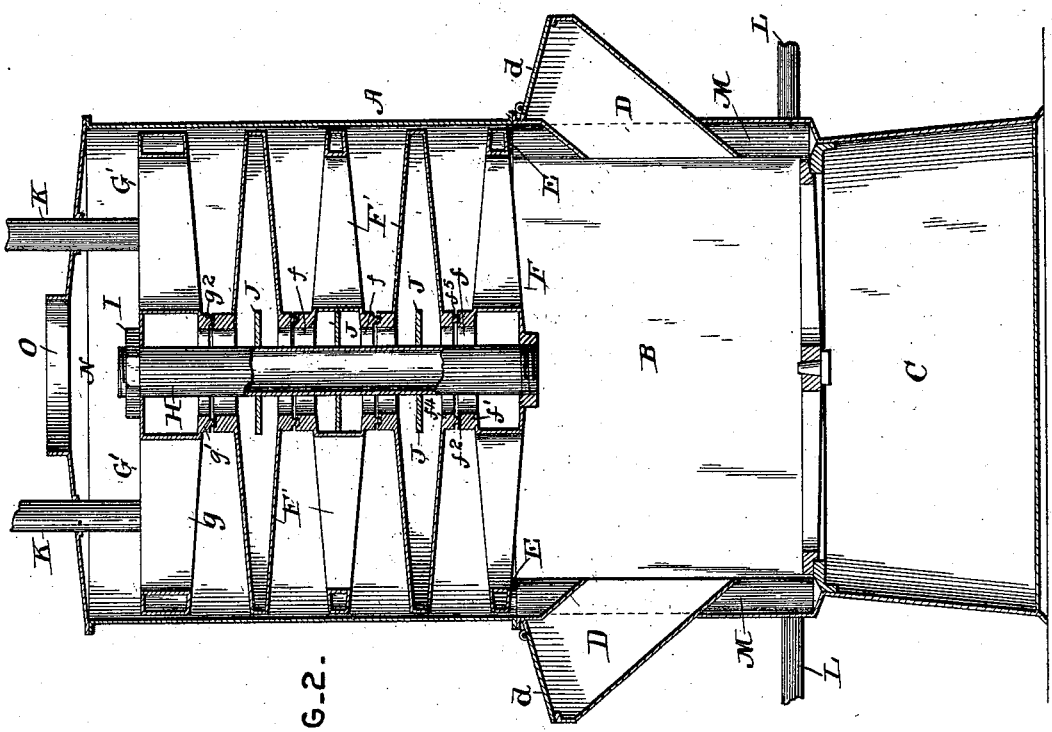

In the accompanying drawings:—Figure 1 is a side elevation of a water heater constructed in accordance with this invention. Fig. 2 is a vertical longitudinal sectional view of the same. Fig. 3 is a detail in plan of one of the bottom hollow circulating pans. Fig. 4 is a detail sectional view of the pan joints. Fig. 5 is a detail elevation of the central clamping flue.

Referring to the accompanying drawings;—A represents the casing of my improved heater which incloses at the lower end thereof an ordinary firepot B, below which is located the ordinary ash pit C, having the ordinary ash pit doors $c$, while the fire pot is provided with the door $b$ for removing clinkers, &c., from the same and the same is further provided with the lateral feed chutes or openings D, inclosed by the hinged doors $d$, fitting over and inclosing the open upper ends of said chutes. Horizontally supported above the fire pot B and securely coupled thereto by means of suitable nipples E, is the bottom water circulating pan F. The said water circulating pan F incloses a water circulating space that tapers from the central openings $f$ through the top and bottom of the same, to its circumference, at which point the width of the hollow circular pan is considerably less than the width at the center of the same. The said hollow pan F is provided with a series of smoke flues G extending entirely through the same and allowing a passage for the smoke and other products of combustion which must necessarily heat the water circulating through said lower pan. Said hollow circulating pan is further provided with an upwardly extending neck $f'$, extending above the top opening $f$ therein, and provided with an annular groove $f^2$, which is provided with a suitable packing $f^3$, preferably of asbestus, which is not affected by the heat from the fire.

Located and supported above and upon the lower hollow circular pan F are a series of similarly constructed circular hollow water circulating pans F', similarly constructed and also provided with a series of vertical flues therethrough, and the upwardly extending grooved necks described. Each of the superposed pans F', are further provided with the downwardly projecting necks $f^4$, extending below the lower openings $f$ in the pan and provided with the annular tongues $f^5$, which take into the annular grooves of the neck of the pan immediately below the same, and thus form a secure and water tight joint between the several pans, which on account of their construction, are spaced from each other by said necks, and which space increases toward the casing, at which point it is the greatest, to allow a free dissemination of smoke and other products of combustion through the various flues of the water pans and around the same. Resting upon the uppermost hollow pan F' is the circular water drum G' which is provided with a series of smoke flues $g$ corresponding to those in the water pans, and a downwardly projecting neck $g'$ having an annular tongue $g^2$ taking into the annular groove of the uppermost water pan therebeneath. The said hollow water pan and the top drum are so arranged as to break joints with each other and have their respective flues out of alignment, so that the smoke and other products of combustion in ascending must take a circuitous passage therethrough and around the same.

A central clamping flue H passes centrally through the entire series of hollow water pans and projects above the top of the upper water drum G' and below the bottom of the bottom water pan F. The upper and lower ends of said clamping flue G are threaded to receive the clamping nuts I thereover. It will be readily seen that by tightening the clamping nut I working over the top of the water drum after screwing the flue into the lower ring, that the whole series of water pans and the top water drum will be tightly and securely clamped together. The diameter of the central clamping flue is less than that of the central openings $f$ in the top and bottom of the water pans through which the same passes, so as to allow a free circulation of the water from the lowermost water pan and through the intermediate pans to the top water drum. Circular deflecting diaphragms J encircle the central clamping flue H, intermediate of the top and bottom openings $f$ in each of the intermediate hollow water pans F', and extend from said central clamping flue to the radial series of vertical flues G to each pan, and thus serve to cause the rising water to take a course around the flues G before the same can find escape up through the openings $f$ into the next succeeding water pan. A thorough circulation of the water is thereby obtained and the same thoroughly heated in its passage. The flow pipes K are connected with the upper water drum G' and carry the water to the points desired for the purposes to which it is placed, and the water is returned to complete the circulation to the lowermost water pan F, by means of the return pipes L connected with the vertical pipe sections M connected to said bottom water pan, which is supported in or directly over the fire box B. The said pipes M are connected to opposite edges of the said bottom water pan and thus cause the water to flow from the outer reduced portion of said pan toward the larger central portion, around the vertical flues G and to the central clamping tube H. The water from this lower pan passes up into the next communicating pan and is deflected by the deflector J away from the center of said succeeding pan and around the smoke and combustion flues G. The tapering of said pans, as will be readily noted, always give to the water a continuous climb and ascent until it reaches the upper water drum G' from which it passes out through the circulating flow pipes K to the points of use in a thoroughly heated condition and in a continuous and steady flow.

The top of the casing A terminates in a smoke chamber N into which the products of combustion pass from the various flues, and pass off through the escape openings A communicating with said chamber. It will be readily noted that the water passing through the apparatus is constantly in contact with the various joints connecting the various parts together and thus prevents the smoke and other products of combustion from burning said parts out and rendering the apparatus defective.

The construction and many advantages of the herein described heater are now thought to be apparent, but numerous details of construction may be modified as may be deemed necessary without departing from the spirit of my invention.

Having thus described my invention, what I claim, and desire to secure by Letters Patent, is—

1. In a hot water heater, the combination with the casing, of a series of hollow circular water pans communicating with and arranged one above the other, a clamping flue passing centrally through said pans and connecting the same together, said flue being open at both ends and having an upper threaded end projecting above the upper pan, and a clamping nut engaging said upper projecting end substantially as set forth.

2. In a hot water heater, the combination with the furnace casing, of a series of hollow water circulating pans communicating with and arranged one above the other, said pans tapering from their centers to their circumferences, a central clamping flue passing through and clamping together said water pans, said flue being open at both ends and having an upper threaded end projecting above the upper pan, and a clamping nut engaging said upper projecting end, substantially as set forth.

3. In a hot water heater, the combination of a series of circular hollow water circulating pans arranged one above the other, said pans being provided with central top and bottom openings communicating with each other, a series of flues extending vertically therethrough, and the same tapering from their central openings to their circumferences, a vertical clamping flue passing through and concentric with the central openings of said water pans and clamping the same firmly together, said flue being open at both ends and having an upper threaded end projecting above the upper pan and a clamping nut engaging said upper projecting end, substantially as set forth.

4. In a hot water heater, the combination of a series of circular hollow water circulating water pans arranged one above the other, said pans being provided with central top and bottom openings communicating with each other and a series of flues extending vertically therethrough, horizontal circular deflecting plates arranged within each pan between the top and bottom openings therein and extending to the flues therethrough, a vertical clamping flue passing through and concentric with the central openings of said water pans, and snugly through said deflecting plates, said flue being open at both ends and having an upper threaded end projecting above the upper pan, and a clamping nut engaging said upper projecting end substantially as set forth.

5. In a hot water heater, the combination with the furnace casing, of a series of hollow water circulating pans communicating with and arranged one above the other in said casing, an upper water drum connected with said pans, a central clamping flue passing through said pans and top water drum and clamping the same together, said flue being open at both ends and having an upper threaded end projecting above the upper pan, a clamping nut engaging said upper projecting end, and circulating pipes connected with the outer edges of the lowermost water pan and to the upper water drum, substantially as set forth.

In testimony that I claim the foregoing as my own I have hereto affixed my signature in the presence of two witnesses.

ADAM PINNEY.

Witnesses:
   J. J. McGOWAN,
   JOHN ROBB.